UNITED STATES PATENT OFFICE.

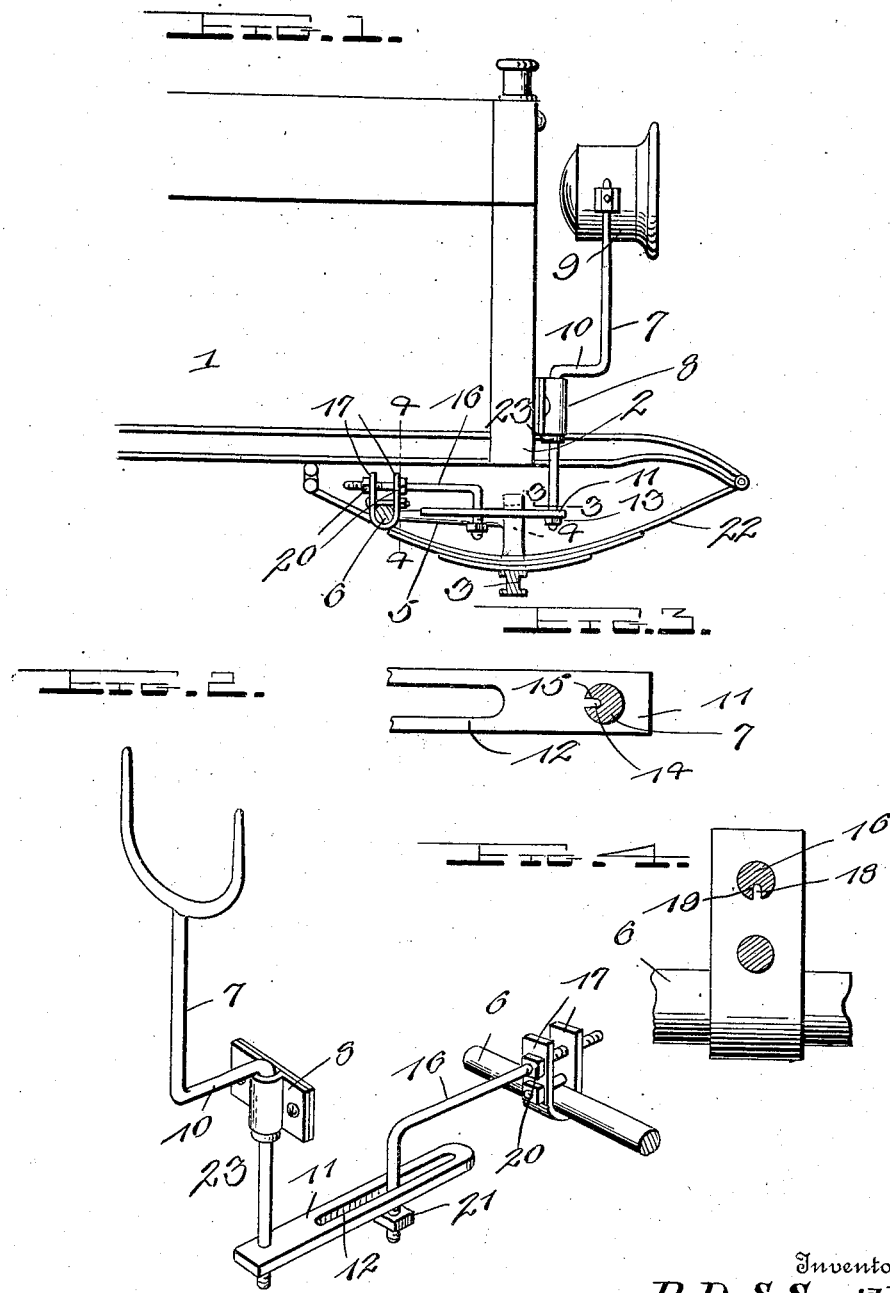

RALPH DE SLAZO SMITH, OF CORDELL, OKLAHOMA.

DIRIGIBLE LIGHT.

1,064,389.  Specification of Letters Patent.  Patented June 10, 1913.

Application filed June 8, 1912. Serial No. 702,611.

*To all whom it may concern:*

Be it known that I, RALPH DE S. SMITH, a citizen of the United States, residing at Cordell, in the county of Washita and State of Oklahoma, have invented certain new and useful Improvements in Dirigible Lights, of which the following is a specification, reference being had to the accompanying drawings.

This invention comprehends certain new and useful improvements in vehicle head lights and relates more particularly to that class of lights known as dirigible lights.

The primary object of the invention is to provide a dirigible head light for motor vehicles which shall automatically adjust itself so as to always throw its rays directly in the path of the automobile.

Another object of the invention is to provide an automatic head light which shall be extremely simple in construction, which may be easily adjusted to fit various makes of machines, and which may be quickly and easily applied in position.

Another object of the invention is to provide a light for automobiles which shall enable pedestrians crossing in front of cars so equipped, to tell at a glance the exact direction in which the machine is proceeding, thereby tending to do away with indecision of persons when quickly warned of the approach of a machine.

With these and other objects in view as shall become more apparent as the description proceeds, the invention consists in certain novel features of construction and arrangement of parts as I shall hereinafter fully describe and claim.

For a complete understanding of my invention, reference is to be had to the following description and accompanying drawing, in which, Figure 1 is a side elevation of my invention applied to an automobile. Fig. 2 is a perspective view. Fig. 3 is a detail view taken on the plane of line 3—3 of Fig. 1, and Fig. 4 is a detail view taken on the plane of line 4—4 of Fig. 1.

Referring to the drawing by numerals, 1 designates the fore part of an automobile constructed in the usual manner and having the frame 2, the axle 3 and steering knuckles 4, provided with the rearwardly extending steering arms 5 which are connected to each other by the transverse steering rod 6.

7 denotes a lamp supporting rod secured centrally of the frame member 2 by the bearing bracket 8. The upper end of the supporting rod is provided with a U-shaped frame between the arms of which the lamp 9 is secured in the customary manner. A shoulder 10 is formed in the rod 7 by bending it outwardly and upwardly. This shoulder bears against the upper edge of the bracket 8 and prevents said rod from slipping downwardly. A rearwardly projecting connecting bar 11 provided with a longitudinal slot 12 is secured at its forward end to the lower end of the supporting rod 7. The connection is made by extending the rod 7 through an opening in the connecting bar and then threading a nut 13 on the rod 7 so that it will bind against the under surface of the connecting bar. A tongue 14 is formed in the opening in the bar 11 through which the rod 7 passes and projects into a longitudinal groove 15 formed in said rod. This tongue is for the purpose of preventing any rotary movement of the connecting bar relative to the lamp supporting rod. A longitudinally extending shifting rod 16 is secured at its rear end to a U-shaped connecting member having upwardly extending arms 17 formed with alined openings through which the shifting rod passes. An upwardly projecting tongue 18 is formed within each of these openings and projects into a longitudinal groove 19 formed in the underside of the shifting rod.

Jam nuts 20 are threaded on the rod 16 and engage the arms 17 thereby preventing longitudinal movement of said shifting rod. The forward end of the shifting rod 16 is bent downwardly at right angles to the main portion and projects through the slot 12 in which it is retained by the nut 21. It will be seen that this method of connecting the shifting rod to the connecting bar allows a free vertical movement of one of the members relative to the other, which movement will be caused by the acting of the springs 22. The slot 12 in the connecting bar 11 makes it possible to adjust my device so that it will operate directly on any make of machine now in use. Different cars are provided with different lengths of knuckle arms 5 and this makes it necessary to allow for a certain amount of adjustment, otherwise, different machines would tend to turn the light through different angles depending upon the length of the steering arms. The adjustment above referred to can be easily made by loosening the jam nuts 20 and sliding the rod 16 to the desired position and then tightening the nuts 20 so that the adjustment will be retained.

In order that the lamp supporting rod 7 may be easily and quickly secured to the frame member 2 I provide the bracket 8 with a removable cap plate. A collar 23 is secured about the rod 7 adjacent the under side of the bracket 8 and coöperates with the shoulder 10 to prevent any longitudinal movement of said rod.

The operation of my improved automatic head light is as follows: When the automobile 1 is turned, say to the right, the steering rod 6 moves to the left and this motion is transmitted to the lamp supporting rod 7 through the medium of the shifting rod 16 and the connecting bar 12. Since the rod 7 turns about a vertical axis, the movement of the steering rod 6 to the left will cause the lamp 9 to turn in the opposite direction.

From the foregoing description in connection with the accompanying drawing, it will be seen that I have provided a dirigible head light for automobiles which is extremely simple in construction, which may be quickly applied, and which may be easily adjusted to fit any machine.

It is to be understood that while I have shown a preferred embodiment of my invention, I do not wish to be limited to the exact construction and arrangement of parts herein shown and described, but may make such changes as shall fall within the scope and spirit of the invention.

It will be seen that the device may be easily arranged so as to operate a pair of lamps without departing from the scope of the invention.

Having thus described my invention, what I claim is:—

A dirigible head light for automobiles comprising an arm mounted to turn about a vertical axis, a bracket for supporting said arm, the arm being formed with a downwardly extending portion which engages the top of said bracket, a connecting bar formed with a circular opening in its forward end through which the arm passes, means for securing the connecting bar against rotational movement relative to the arm, a shifting rod positioned in longitudinal alinement with the connecting bar having its forward end bent downwardly and disposed within a longitudinal slot formed in said connecting bar, a U-shaped fastener connected to the steering rod, the arms of said fastener being provided with alined openings through which the rear end of the shifting rod passes, and means for holding said shifting rod against rotational and longitudinal movement.

In testimony whereof I hereunto affix my signature in the presence of two witnesses.

RALPH De SLAZO SMITH.

Witnesses:
 A. R. PRIBBLE,
 A. M. BEETS.

---

Copies of this patent may be obtained for five cents each, by addressing the "Commissioner of Patents, Washington, D. C."